United States Patent [19]

Roos

[11] Patent Number: 4,950,108

[45] Date of Patent: Aug. 21, 1990

[54] DRILL COMPRISING DRILL BODY AND REPLACEABLE DRILL TIP

[75] Inventor: Aage V. Roos, Skärplinge, Sweden

[73] Assignee: Sandvik AB, Sandviken, Sweden

[21] Appl. No.: 369,709

[22] Filed: Jun. 22, 1989

[30] Foreign Application Priority Data

Jun. 23, 1988 [SE] Sweden ................... 8802382

[51] Int. Cl.$^5$ ............................. B23B 51/02
[52] U.S. Cl. ............................ 408/59; 279/8; 408/144; 408/230
[58] Field of Search ............ 408/713, 704, 705, 59, 408/80, 145, 230, 233, 197, 223, 224

[56] References Cited

U.S. PATENT DOCUMENTS

| | | | |
|---|---|---|---|
| 4,222,690 | 9/1980 | Hosoi | 408/230 |
| 4,565,473 | 1/1986 | Hosoi | 408/224 X |
| 4,684,298 | 8/1987 | Roos | 408/59 |
| 4,856,944 | 8/1989 | Reinauer | 408/59 |

Primary Examiner—Z. R. Bilinsky
Attorney, Agent, or Firm—Burns, Doane, Swecker & Mathis

[57] ABSTRACT

A drill for metal working comprises a drill body and a replaceable drill tip. The drill tip carries cutting elements and is releasably fastened to the drill body by means of fasteners which are provided on opposite sides of the centerline of the drill. A rear surface of the drill tip is provided with a central and at least partially conical, recess which is intended to receive a central tap extending forwardly from a mainly planar front surface of the drill body in order to center the drill tip in relation to the drill body. The tap engages the partially conical recess, and includes an elastic portion enabling the tap to yield axially.

15 Claims, 4 Drawing Sheets

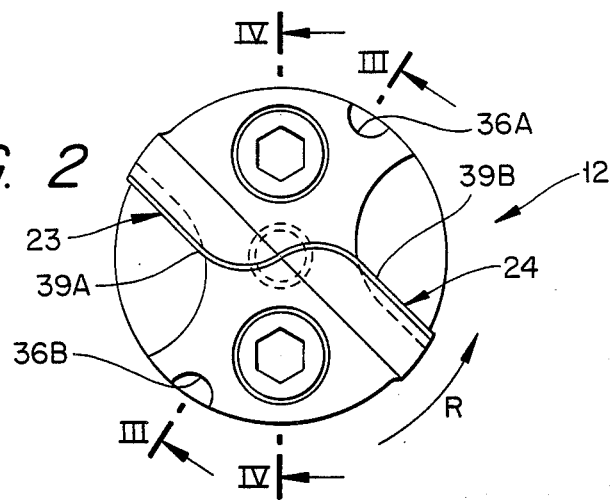
FIG. 2
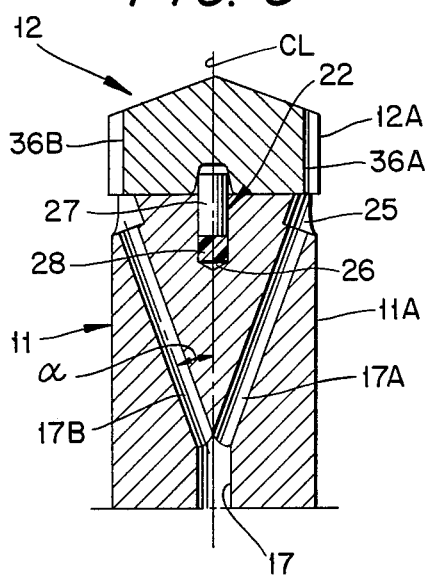
FIG. 3
FIG. 4

DRILL COMPRISING DRILL BODY AND REPLACEABLE DRILL TIP

BACKGROUND AND OBJECTS OF THE INVENTION

The present invention relates to a drill comprising a drill body provided with a drill tip having cutting elements and chip flutes, said drill tip being detachably attached to the front surface of the drill body by fasteners whereby a rear surface of the drill tip and the front surface of the drill body have a centrally located tap or extension and a corresponding recess. The invention also relates to the drill tip per se which is intended to be secured to a drill body.

A drill of the aforementioned type is disclosed in Roos U.S. Pat. No. 4,684,298 wherein a replaceable drill tip is provided with an integral tap or extension which, however, requires a very high manufacturing accuracy in order to assure that the extension and the recesses for the fastening means provided on the tip shall be linearly oriented with corresponding recesses in the drill body. The hard metal of the drill tip is very sensitive to being forced, and the integral tap of the prior drill tip has, therefore, often become broken during the drilling operation. This prior drill also is equipped with fastening means having central flushing channels. These fastening means must therefore be provided with relatively large cross-section diameters to include the channels. This results in a correspondingly reduced thickness of material at the drill tip which reduces its strength.

It is, therefore, a purpose of the present invention to provide a drill with easily exchangeable cutting elements. It is another purpose of the invention to provide a drill with an accurately oriented drill tip.

It is another purpose of the invention to provide a drill with a reliable connection between the drill body and its associated drill tip.

It is another purpose of the invention to provide a drill tip with improved strength.

It is yet another purpose of the invention to provide a drill tip having externally provided flushing channels in order to transmit flushing medium.

SUMMARY OF THE INVENTION

These objects are achieved by the present invention which relates to a rotary drill comprising a drill body defining a front-to-rear rotary axis and having a front end surface and a plurality of chip flutes. The drill also includes a drill tip having a plurality of cutting elements and a rear end surface. Fasteners are provided for securing the drill tip to the drill body. One of the front and rear end surfaces has a recess, and the other of the front and rear end surfaces has a tap or extension received in the recess for properly aligning the drill tip relative to the drill body. The tap includes a resilient portion enabling the tap to yield axially relative to the drill body when entering and cooperating with the recess.

The invention also relates to a drill tip per se which is adapted to be attached to a drill body.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 2 is a front end view of the drill according to the invention;

FIGS. 3 and 4 are longitudinal sectional views of the drill taken along lines III—III and IV—IV, respectively, in FIG. 2;

DETAILED DESCRIPTION OF PREFERRED EMBODIMENTS OF THE INVENTION

Figure 1:
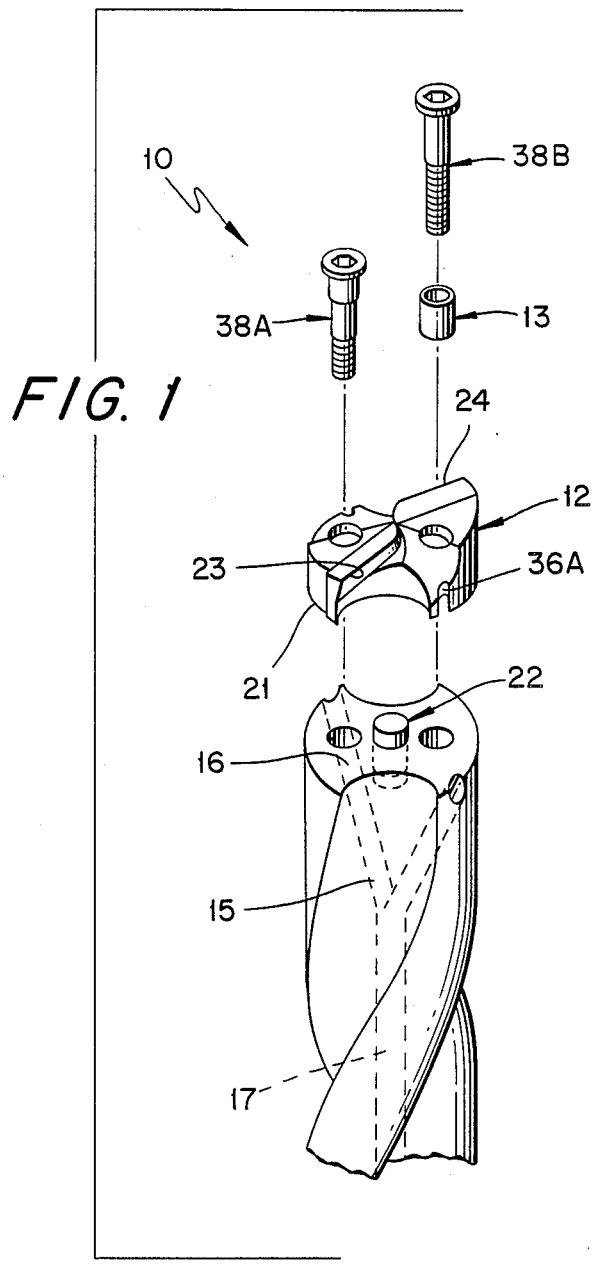
FIG. 1 is an exploded perspective view of a drill according to the invention.
Figure 5:
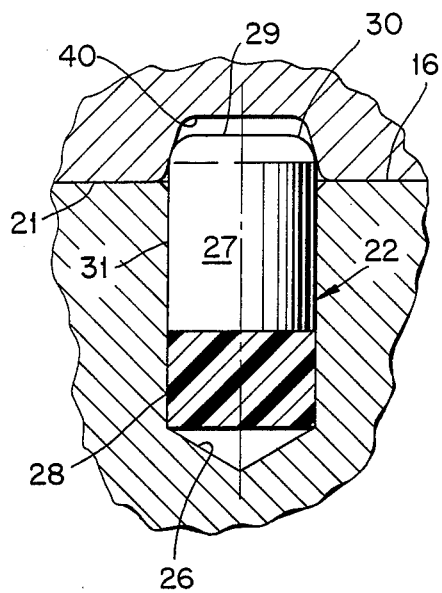
FIG. 5 is an enlarged fragmentary sectional view of one embodiment of a tap according to the present invention.
Figure 6:
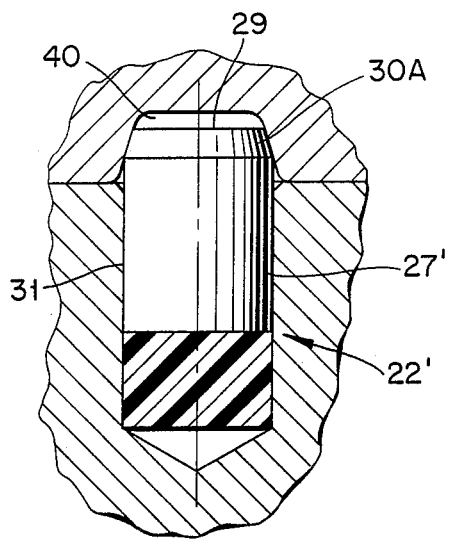
FIG. 6 is a view similar to FIG. 5 of another tap embodiment.

FIGS. 1 and 2 show a drill according to the invention comprising a drill body 11 and a drill tip 12, the drill having a rotary direction R. The drill is substantially cylindrically shaped and includes an anchoring shaft (not shown) and two helical chip flutes 14, 15 which extend from the shaft to the front end of the drill body along an outer side or mantle surface 11A of the drill body. The front surface 16 of the drill body 11 is planar and perpendicularly oriented in relation to the center line or rotary axis CL of the drill. A centrally provided flushing channel 17 extends from the anchoring end to a position located axially behind the front surface 16. The channel 17 is communicating with two diametrically opposed channels 17A and 17B which terminate at the periphery of the front surface 16. A central recess or hole 26 is provided in the front surface 16 of the drill body and a corresponding seating or recess 40 (FIGS. 5–9 and 12) is provided in the underneath or rear end surface 21 of the drill tip 12 to receive an axially yieldable tap 22. The peripheral portions of the hole and the tap are made with close tolerances to define a sliding fit. Their peripheral portions are preferably circular in shape but can be alternatively oval or polygonal in shape. The chip flutes can alternatively be straight. The drill body is intended to be subject of working and hardening separately from the drill tip.

The drill tip 12 has a cylindrical basic shape, the diameter of which substantially corresponds with the diameter of the drill body and the axial length, which at most is equal to one-fifth of the length of the drill body. The drill tip is preferably made entirely of hard material and can, therefore, be provided with a surface coating at high temperature without the risk of melting-down the brazing material. The drill tip can also be made of high speed steel if intended to machine workpieces of softer material. The drill tip 12 also comprises chip flutes, which are provided as extensions of the chip flutes 14, 15 of the drill body, and cutting elements 23, 24 the radially outer portions of which extend beyond the outer side or mantle surface 12A of the drill body.

FIGS. 2, 3 and 4 show the axially foremost portion of the drill shown in FIG. 1. Each of the short channels 17A and 17B is oriented at an acute angle α with the center line CL. This angle α has a value between 15 and 20 degrees, preferably about 18 degrees. The smaller this angle α is selected, the more favorable direction of the discharged flushing fluid is obtained. Each short channel includes an enlarged cylindrical section 25 which terminates in both the front surface 16 and the mantle surface 11A of the drill body 11. The cylindrical section 25 is arranged to facilitate the drilling operation in connection with the fabrication of the short channels.

Figure 9:
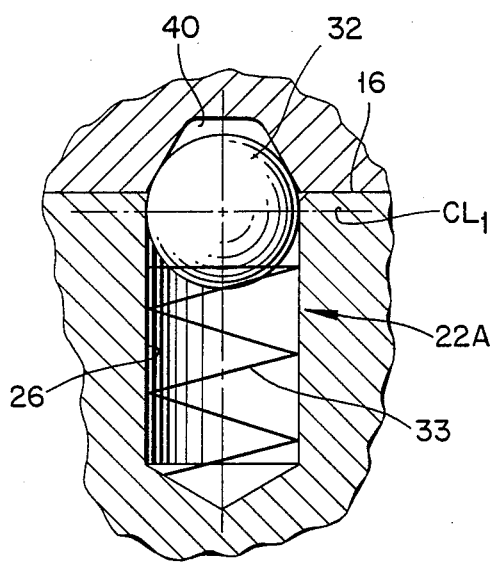
FIG. 9 is a view similar to FIG. 5 of yet another tap embodiment.
Figure 7:
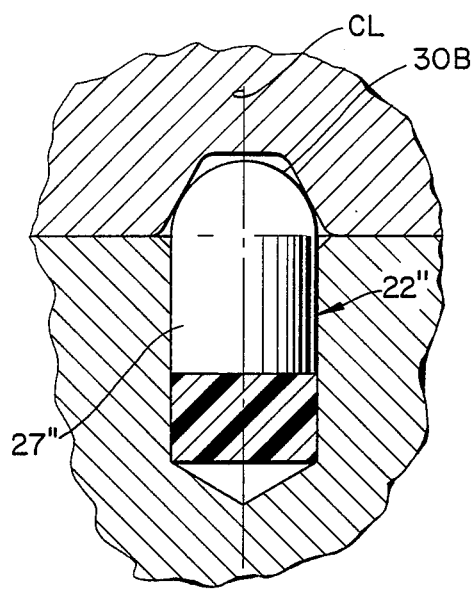
FIG. 7 is a view similar to FIG. 5 of yet another tap embodiment.

The hole 26 provided in the front surface 16 is arranged to receive the tap 22. This tap, which is shown more detailed in FIGS. 3 and 4, comprises a resilient element 28 and a rigid cylindrical tap body 27. The element 28 preferably comprises an elastomeric material such as rubber which is vulcanized to the axially rear end surface of the tap 27. The element 28 and the tap body 27 could also be unattached. At least a portion of the element 28 is provided with a larger diameter than the hole 26 (when the element 28 is in a relaxed state) so that the element 28, when entered into the hole 26 becomes wedgingly engaged therein whereby the tap body attached thereto is kept in its desire axial position. The sliding fit between the hole 26 and the rigid tap body 27 defines the radial position of the tap body 27, i.e., the tap body is prevented from moving radially by an appreciable amount. The axialy forward end of the tap body 27, shown in the FIG. 5 embodiment, is provided by a planar end surface 29 which, by way of a smoothly rounded annular surface 30, joints with the cylindrical mantle surface 31 of the tap body. As shown in the FIG. 6 embodiment, the end surface 29 of tap body 27' can alternatively be connected with the mantle surface 31 by way of a conically beveled face 30A. As shown in FIG. 9, the resilient tap 22A can alternatively be in the form of a spherical ball 32 and a spring 33 whereby the spring is preferably fastened to both the ball and hole 26. The horizontal center line CL of the ball 32 is arranged axially behind the front surface 16 at a distance which approximately corresponds to one-fifth of the radius of the ball in order to utilize the guiding ability of the ball. The axially forward end of the tap body 27" as shown in FIG. 7 could also be a hemispherical body 30B, i.e., a portion corresponding with that part of the ball 32 which lies axially in front of the line CL₁ in FIG. 9.

Figure 8:
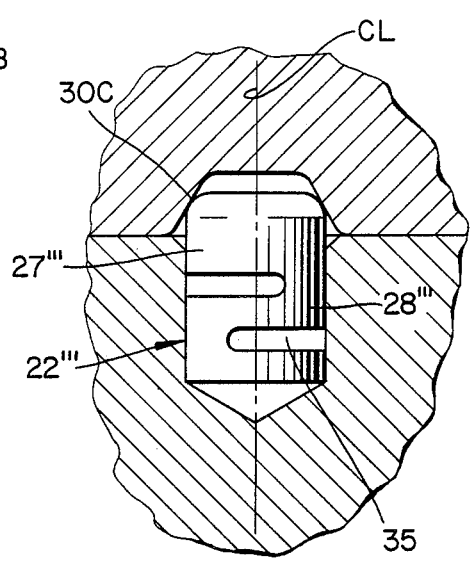
FIG. 8 is a view similar to FIG. 5 of still another tap embodiment.
Figure 12:
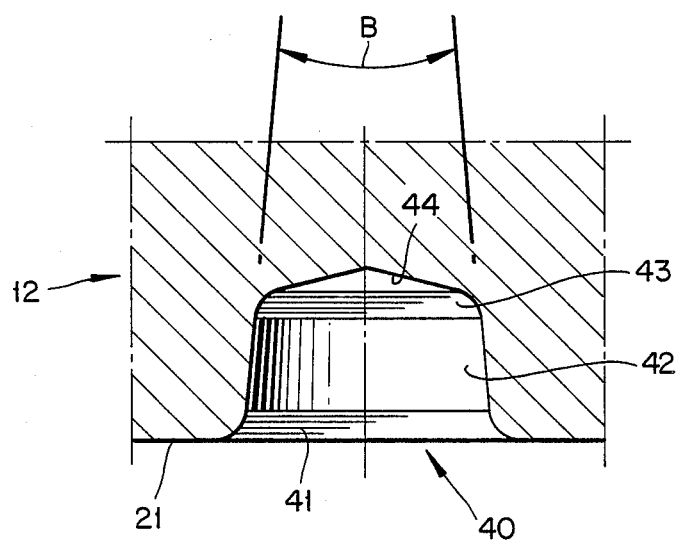
FIG. 12 is a fragmentary sectional view of a tap-receiving recess in a drill tip according to the invention.

FIG. 8 shows a tap 22''' whereby the rigid body portion 27''' and the resilient portion 28''' are made in one-piece, with slots 35 oriented approximately perpendicular to the center axis of the drill being provided in the tap 22'''. These slots 35 will enable the tap 22''' to be axially compressed in its axial direction. The axial length of the tap 22''' is in the order of 10 mm and its extension from the front surface 16 is approximately 1 mm.

The terms "elastic" and "resilient" are intended to mean that there is possible an axial compression of approximately 0.1 to 0.3 mm which is a substantially larger elasticity than the elasticity of a "rigid" steel body of corresponding dimension and applied force. The expression "rigid" means an elasticity below the yield point of the rigid body portion 27, 27', 27", 27''' and 32.

Figure 10:
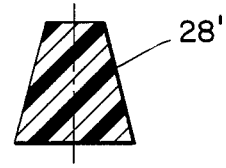
FIGS. 10 and 11 are longitudinal sectional views of two different embodiments of elastic inserts for the tap.
Figure 11:
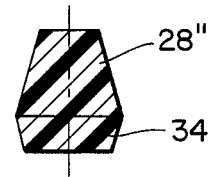

The elastic elements 28 and 33 are mutually exchangeable or exchangeable for a spring package type Belleville-springs or those alternatives shown in FIGS. 10 and 11. FIG. 10 shows an elastic element 28' in the form of a truncated cone, the base of which shall be facing the bottom of hole 26 while having a diameter larger than the diameter of the hole when the element 28' is relaxed. FIG. 11 shows an elastic element 28" shaped as a double cone provided with a peripheral ridge or upset 34. This upset 34 is larger in diameter than the hole 26 when the element is relaxed, whereby the upset shall abut against the inner wall of hole 26 and the double taper will improve the radial elasticity of the element. These elastic elements 28' and 28" can be provided in several different alternative ways.

By reference to the drawings, a more detailed description of the drill tip will be made hereinafter. The drill tip 12 has a mainly cylindrical basic shape with a mainly planar rear end surface 21 and a somewhat conical front side. The drill tip has chip flutes which are provided as extensions of the chip flutes 14 and 15 provided in the drill body 11. The mantle surface 12A of the drill tip 12 is non-continuous in the peripheral direction, not only due to the provision of the chip flutes, but also due to the provision of channels 36A and 36B. These channels are provided with a mainly semi-spherical cross-section and extend in a direction parallel to the center line CL of the drill. These channels are provided on diametrically opposed locations and extend from the front side of the drill tip, and down to its rear end surface 21. The same is true of two bores 37A and 37B which are provided in the drill tip 12 for the receipt of fastener screws 38A and 38B. A sleeve 13 of soft material could be provided between the screw and its bore. The provision of these bores 37A and 37B and the screws 38A and 38B are described more in detail in Roos U.S. Pat. No. 4,684,298 which is herewith incorporated by reference in the description. The channels 36A and 36B alternate with associating bores 37A and 37B in the rotary direction R of the drill.

The cutting elements 23, 24 of the drill tip have cutting edges 39A and 39B, which meet in the center of the tip to form an S-shaped contour, and positive chip faces whereby the degree of curvature of edges 39A and 39B is larger adjacent to the center line of the drill than at position more radially distant therefrom. The shape of the cutting edges and the chip faces is described more in detail in R.Hosoi U.S. Pat. No. 4,222,690 and T.Hosoi U.S. Pat. No. 4,565,473, which are herewith incorporated by reference in the description.

The seating or recess 40 of the drill tip (FIG. 12) is provided centrally thereon whilst oriented perpendicularly to the rear end surface 21. The recess 40 comprises a beveled entry face 41 which has a convex cross-section, so that the diameter of the face 41 decreases forwardly from the rear end surface. The face 41 joins a conical surface 42 which tapers forwardly, the cone angle β being about 10 to 30 degrees, preferably 14 to 20 degrees. In case the seating is to receive a spherically formed tap end it is necessary to provide a cone angle β that is at least 25 degrees. The conical surface 42 joins forwardly a terminating face 43 which has a concave cross-section such that the diameter of the face 43 diminishes in the forward direction. A front end of the face 43 joins a conical bottom surface 44.

The mounting of the tip 12 onto the drill body 11 occurs in the following manner.

The resilient tap 22 comprised of a rigid tap body 27, 27', 27" and a resilient element 28, 28', 28''', or a ball 32 and a spring 33, or a slotted tap 22''' is entered into the hole 26 of the drill body until the axially rearward end thereof comes into abutment with the bottom (rear end) of the hole 26. The recess 40 of the drill tip is then approximately oriented linearly with regard to the tap with the bores 37A, 37B facing corresponding threaded holes in the drill body. The recess 40 is placed onto the tap 22 whereby the axially foremost end of the tap, i.e., the surface 30, 30A, 30B, 30C or 32 abuts against a portion of the conical surface 42 of the recess. The screws 38A and 38B are then entered into the bores 37A and 37B, respectively, and are threadably engaged therein in a cross-wise pattern. The recess 40 is oriented to a central position by cooperation between the end portion of the tap and the conical surface of the recess whereby a mainly circular line of abutment occurs between the tap and the recess.

If necessary, in order to enable the rear and front end surfaces 21 and 16 to be brought into tight contact, the yieldable to according to the present invention is able to be displaced axially backwards into the hole 26 due to the resilience of the element 28, the displacement being at most about 0.3 mm. The rear end surface 21 of the tap is then brought into abutment with the front surface 16 of the drill body whereby a stable and accurately centralized connection is obtained. The axially inner portions of the channels 36A and 36B are now aligned with regard to the axially foremost portions 17A and 17B of the short channels. If, on the other hand, the tap were not resilient according to the invention, this type of connection would have been very sensitive for inaccurate tolerances in the axial direction, i.e., in many cases it would not have been possible to obtain abutment between the surfaces 16 and 21.

When disassembling the tap and the drill body, the screws are loosened entirely whereby the axially compressed tap forces the drill tip axially forwardly. The drill tip can then be easily removed from the drill body.

The invention thus relates to a drill and a releasably provided drill tip the formation of which enables that an accurately centered and stable connection to be obtained.

Although the present invention has been described in connection with a preferred embodiment thereof it will be appreciated by those skilled in the art that modifications, substitutions, and deletions not specifically described may be made without departing from the spirit and scope of the invention as defined in the appended claims.

What is claimed is:

1. A rotary drill comprising a drill body defining a front-to-rear rotary axis and having a front end surface and a plurality of chip flutes, a drill tip having a plurality of cutting elements and a rear end surface, and fasteners for securing said drill tip to said drill body, one of said front and rear end surfaces having a recess, and the other of said front and rear end surfaces having a tap received in said recess for properly aligning said drill tip relative to said drill body, said tap including resilient means enabling said tap to yield axially relative to said drill body when entering and cooperating with said recess.

2. A rotary drill according to claim 1, wherein said tap is carried by said drill body and said recess is formed in said drill tip.

3. A rotary drill according to claim 1, wherein a portion of said recess engaged by said tap is of forwardly tapering configuration.

4. A rotary drill according to claim 1, wherein said other surface includes a hole, said tap comprising a rigid portion projecting axially beyond said hole and a resilient portion defining said resilient means located within said hole for biasing said rigid portion toward said recess.

5. A rotary drill according to claim 1, wherein said recess is oriented coaxially with said axis, said one end surface being oriented perpendicular to said axis, said recess comprising an entering face portion which intersects said one end surface and is of convex shape so as to diminish in cross-section in a direction away from said one end surface, a conical surface disposed contiguously with said entering surface and tapering in a direction away from said one end surface, a conical bottom surface closing-off said recess, and a transition face interconnecting said conical surface and said bottom surface and being of concave shape so as to be of diminishing cross-section in a direction away from said one end surface.

6. A rotary drill according to claim 4, wherein said rigid portion is of generally cylindrical shape and terminating in a conical free end.

7. A rotary drill according to claim 4, wherein said rigid portion is of generally cylindrical shape terminating in a substantially semi-spherical axially free end.

8. A rotary drill according to claim 4, wherein said rigid portion is of spherical shape, an imaginary plane oriented parallel to said one end surface and containing a center of said spherical rigid portion being spaced axially from said one end surface.

9. A rotary drill according to claim 4, wherein said resilient portion comprises an elastomeric member.

10. A rotary drill according to claim 4, wherein said resilient portion comprises a helical spring.

11. A rotary drill according to claim 4, wherein said rigid and resilient portions comprise parts of a one piece member, said member including slots defining said resilient portion.

12. A rotary drill according to claim 9, wherein said elastomeric member, when in a relaxed state, tapers toward opposite axial ends thereof from a location disposed intermediate said axial ends so as to form an annular ridge at said location.

13. A rotary drill according to claim 1, wherein said drill body includes an axially extending first fluid channel terminating short of said front end surface, and a plurality of second channels extending forwardly from said first channel at an acute angle relative to said axis, each of said second channels intersecting both said front end surface and a mantle surface of said drill body, said drill tip including a plurality of third channels extending parallel to said axis, said third channels being defined by recesses in a mantle surface of said drill tip, said third channels communicating with respective ones of said second channels.

14. A drill tip adapted to be mounted to a front end of a drill body, said drill tip including a generally cylindrical mantle surface defining a cylindrical front-to-rear extending axis, said drill tip including cutting edges at a front end thereof, through-holes for receiving fasteners, and a rear end surface including a forwardly extending recess which is coaxial with said axis, at least a portion of said recess diminishing in cross-section in a forward direction, two diametrically opposing flushing channels being oriented parallel with said axis and extending forwardly from said rear end surface to said front end for conducting flushing fluid to the latter, said channels defined by recesses in said mantle surface, said through-holes extending from said front end to said rear end in directions parallel to said axis and being spaced from said flushing channels whereby said flushing channels are not obstructed by the presence of fasteners in said through-holes.

15. A drill tip according to claim 14, wherein said portion of said recess which diminishes in cross-section in a forward direction extends up to said rear end surface.

* * * * *